(12) United States Patent
Lee et al.

(10) Patent No.: US 10,366,797 B2
(45) Date of Patent: Jul. 30, 2019

(54) SYSTEM AND METHOD FOR PREVENTING AND MONITORING LEAKAGE OF WATER FROM TANK LINER

(71) Applicant: KOREA ATOMIC ENERGY RESEARCH INSTITUTE, Daejeon (KR)

(72) Inventors: Jong Min Lee, Daejeon (KR); Byung Ho Kwak, Daejeon (KR); Un-Soo Jung, Daejeon (KR); Jeong-Soo Ryu, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 365 days.

(21) Appl. No.: 15/349,016

(22) Filed: Nov. 11, 2016

(65) Prior Publication Data

US 2017/0221592 A1 Aug. 3, 2017

(30) Foreign Application Priority Data

Sep. 17, 2015 (KR) .................. 10-2015-0131315

(51) Int. Cl.
*G21C 19/40* (2006.01)
*G21C 19/07* (2006.01)
(Continued)

(52) U.S. Cl.
CPC ............ *G21C 19/40* (2013.01); *G21C 13/10* (2013.01); *G21C 17/002* (2013.01); *G21C 19/07* (2013.01); *Y10T 137/6966* (2015.04)

(58) Field of Classification Search
CPC ...... G21C 13/10; G21C 17/002; G21C 19/07; G21C 19/40; Y10T 137/6966
(Continued)

(56) References Cited

U.S. PATENT DOCUMENTS 3,444,725 A * 5/1969 Chave .................. G01M 3/226
376/256
4,081,323 A * 3/1978 Gans, Jr. ................ G21C 13/10
376/250
(Continued)

FOREIGN PATENT DOCUMENTS

JP 2014-066611 A 4/2014
KR 20-0281437 Y1 7/2002
(Continued)

OTHER PUBLICATIONS

Korean Office Action dated May 2, 2016.

*Primary Examiner* — Mary E McManmon
*Assistant Examiner* — Jonathan J Waddy
(74) *Attorney, Agent, or Firm* — Rabin & Berdo, P.C.

(57) ABSTRACT

Disclosed are a system and method for preventing and monitoring a leakage of water from a tank liner at a storage tank having: a concrete reservoir; the tank liner made up of a wall liner that is formed by coupling a plurality of first panels and is attached to an inner wall of the concrete reservoir, and a floor liner that is formed by coupling a plurality of second panels, is attached to a floor of the concrete reservoir, and is coupled to the wall liner by welding; a leaking water collecting plate formed by welding a plurality of third panels and inserted between the floor liner and the floor of the concrete reservoir; and an edge leaking water collecting channel buried in an edge of the storage tank and configured to collect leaking water discharged between the floor liner and the leaking water collecting plate.

11 Claims, 6 Drawing Sheets

(51) Int. Cl.
*G21C 13/10* (2006.01)
*G21C 17/00* (2006.01)

(58) Field of Classification Search
USPC .......................................... 137/343, 362, 375
See application file for complete search history.

(56) References Cited

U.S. PATENT DOCUMENTS

| | | | | | |
|---|---|---|---|---|---|
| 4,178,729 | A | * | 12/1979 | Jennings | E04H 7/26 250/517.1 |
| 4,406,855 | A | * | 9/1983 | Schwiers | G21C 17/002 376/250 |
| 4,458,458 | A | * | 7/1984 | Orii | B65D 90/043 220/694 |
| 4,473,974 | A | * | 10/1984 | Orii | G21C 19/07 376/250 |
| 4,764,336 | A | * | 8/1988 | Aubert | G21C 13/093 376/245 |
| 4,916,939 | A | * | 4/1990 | Mogel | E04F 15/02 220/560.03 |
| 6,431,387 | B2 | | 8/2002 | Piehler | |
| 2015/0071398 | A1 | * | 3/2015 | Singh | G21F 5/005 376/272 |
| 2016/0099085 | A1 | * | 4/2016 | Singh | G21C 19/07 376/299 |

FOREIGN PATENT DOCUMENTS

| | | |
|---|---|---|
| KR | 10-0517121 B1 | 9/2005 |
| KR | 10-1013733 B1 | 2/2011 |

\* cited by examiner

SYSTEM AND METHOD FOR PREVENTING AND MONITORING LEAKAGE OF WATER FROM TANK LINER

BACKGROUND OF THE INVENTION

Field of the Invention

The present invention relates to a system and method for preventing and monitoring leakage of water from a tank liner.

Description of the Related Art

Nuclear fuel in use (or fresh nuclear fuel) and spent nuclear fuel (or used nuclear fuel) of research reactors and spent nuclear fuel of commercial reactors are stored in a storage tank to cool the nuclear fuel and to shield radioactive rays from escaping to the outside. To this end, a reinforced concrete structure is installed outside the storage tank to maintain rigidity thereof. A tank liner is installed on a wall and a floor of the storage tank. The tank liner is formed by welding metal plates, and is attached to reinforced concrete so that it serves to ensure a water level of the storage tank and to prevent damage to the reinforced concrete structure.

At present, the storage tank for storing the nuclear fuel is designed to install a leaking water collecting system between the tank liner and the reinforced concrete in consideration of potential damage to the tank liner to make it possible to collect water leaking from the storage tank. The leaking water collecting system is installed along a weld zone of the tank liner, and is designed such that leaking water generated by damage to the weld zone is collected to a leaking water storage tank. However, the leaking water collecting system includes the following technical problems.

First, the leaking water collecting system can ascertain whether or not the leakage of water occurs, but not where the leakage of water occurs. Known methods of ascertaining where the leakage of water occurs include a macrographic test for the inside of the storage tank, a test using installation of a dedicated device (for example, a vacuum box device), and so on. A test for all regions of the tank liner is very difficult to perform due to restriction of accessibility, applicability, and so on.

Second, a part of the water in the nuclear fuel storage tank during an operation period is always evaporated in the air. Therefore, it is difficult to distinguish a reduction in the water of the storage tank caused by slight damage to the tank liner from a reduction in the water of the storage tank caused by evaporation. This leakage of water leads to expansion of a damaged region of the tank liner, and can result in an accident of excessive leakage of water.

Third, when an excessive leakage of water occurs, the water of the storage tank leaks between the leaking water collecting system and the reinforced concrete to bring about loss of a nuclear fuel cooling function, damage to the reinforced concrete structure, and environmental discharge of radioactive substances.

Figure 1:
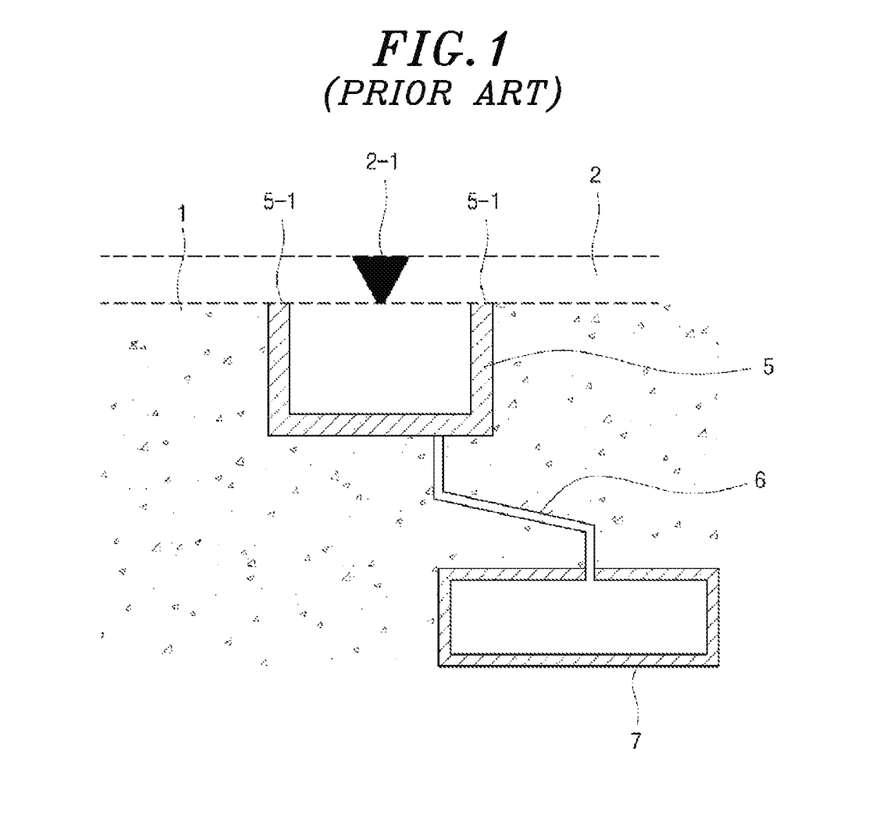
FIG. 1 is a view illustrating the related art.

In the related art, as illustrated in FIG. 1, the tank liner 2 on the top of the floor of the storage tank is formed by mutually welding several metal plates. Since a weld zone 2-1 is most vulnerable, there is a high possibility of the leakage of water occurring, and a leaking water collecting channel 5 is installed under the weld zone 2-1. Leaking water collected in the leaking water collecting channel 5 can be delivered to a leaking water reservoir 7 along a connecting pipe 6.

Since the leaking water collecting channel 5 is buried in the floor when a reinforced concrete layer 1 (hereinafter referred to as "concrete floor") acting as an outer layer of the tank liner 2 is constructed, a bottom of the tank liner 2 and opposite upper ends 5-1 of the leaking water collecting channel 5 cannot be mutually welded when the tank liner 2 is installed on an inner surface of the concrete floor 1.

Thus, when the water of the storage tank, which leaks from the weld zone 2-1 of the tank liner 2, exceeds a flow rate at which the water flows into the leaking water reservoir 7, the water overflows the opposite upper ends 5-1 of the leaking water collecting channel 5 and soaks into the concrete.

In this case, there is no method of preventing the leakage of water and, as described above, it is very difficult to ascertain whether and where the leakage of water occurs. Moreover, there is problem that can be led to the environmental discharge of the radioactive substances.

That is, the leaking water collecting system developed so far is installed on the wall and bottom of the weld zone of the tank liner. Since the leaking water collecting system installed on the wall is installed before the reinforced concrete is poured in view of a working process, it can be coupled with the wall of the tank liner in an airtight structure. Since the leaking water collecting system installed on the bottom is buried in the reinforced concrete first and then the bottom of the tank liner covers an upper portion of the leaking water collecting system, the leaking water collecting system cannot be coupled with the bottom of the tank liner in an airtight structure.

Therefore, various test devices such as a macrographic test using a camera, a test using a vacuum box, and so on is developed for the purpose of a test for the nuclear fuel tank liner during an operation. However, these test devices have many restrictions of time and space in the event of testing the nuclear fuel tank liner, and are accompanied with many difficulties in ascertaining a leak. Further, when such a leak is discovered, rapid sealing work should be performed to prevent an additional leakage of water.

Accordingly, there is a need to develop means for effectively preventing the leakage of water from the tank liner and means for reliably finding out where the leakage of water occurs.

The foregoing is intended merely to aid in the understanding of the background of the present invention, and is not intended to mean that the present invention falls within the purview of the related art that is already known to those skilled in the art.

DOCUMENTS OF RELATED ART (Patent Document 1) Korean Patent No. 10-0517121 (registered date: 2005. Sep. 16)

(Patent Document 2) Korean Utility Model No. 20-0281437 (registered date: 2002. Jun. 27)

(Patent Document 3) U.S. Pat. No. 6,431,387 (issued date: 2002. Aug. 13)

SUMMARY OF THE INVENTION

Accordingly, the present invention has been made keeping in mind the above problems occurring in the related art, and the present invention is intended to provide a system and method for preventing and monitoring a leakage of water from a tank liner, the system and method capable of securing soundness of the tank liner of a nuclear fuel storage tank and accurately ascertaining a leak.

Further, the present invention is intended to provide a system and method for preventing and monitoring a leakage of water from a tank liner, the system and method designed to allow the tank liner provided for the system for preventing the leakage of water to serve as a tank liner of a secondary nuclear fuel storage tank, and the system and method capable of preventing a loss of water in a storage tank and a discharge of the water to an external environment in the event of damage to a weld zone of the tank liner.

In order to achieve the above object, according to one aspect of the present invention, there is provided a system for preventing and monitoring a leakage of water from a tank liner at a storage tank. The system includes: a concrete reservoir; the tank liner made up of a wall liner that is formed by coupling a plurality of first panels and is attached to an inner wall of the concrete reservoir, and a floor liner that is formed by coupling a plurality of second panels, is attached to a floor of the concrete reservoir, and is coupled to the wall liner by welding; a leaking water collecting plate formed by welding a plurality of third panels and inserted between the floor liner and the floor of the concrete reservoir; and an edge leaking water collecting channel buried in an edge of the storage tank and configured to collect leaking water discharged between the floor liner and the leaking water collecting plate.

Here, the system may further include a wall leaking water collecting channel that is buried in a wall of the concrete reservoir on an outer surface of the wall liner, is formed along a weld zone between the first panels at a long length, and is coupled to the edge leaking water collecting channel at a lower portion thereof.

Further, the system may further include a coupler that is buried in the floor of the concrete reservoir floor at a lower portion thereof, protrudes to correspond to a thickness of the third panel at an upper portion thereof, is formed as long as a length of the third panel, and is coupled with the third panels by welding the third panels at opposite upper sides thereof.

In this case, a weld zone between the second panels may be disposed above the coupler in a length direction of the coupler, and the coupler may serve as a floor leaking water collecting channel as a cross-sectional shape is formed as a channel shape whose upper portion is open.

Further, a weld zone between the second panels may be disposed above the coupler in a length direction of the coupler, and the coupler may serve as a floor coupling block as an inside thereof is formed in a solid block form.

Meanwhile, the system may further include a heavy structure support that is buried in the floor of the concrete reservoir at a lower portion thereof, protrudes to correspond to a length adding up thicknesses of the second and third panels at an upper portion thereof, passes through the second and third panels to expose an upper surface thereof to the floor of the storage tank, and is welded to the second and third panels at an upper edge thereof.

Further, the system may further include a through part that has a cylindrical sleeve formed by extending up to a lower portion of the concrete reservoir and is welded to the second and third panels at an upper edge thereof, the cylindrical sleeve being buried in the floor of the concrete reservoir at a lower portion thereof, protruding to correspond to a length adding up thicknesses of the second and third panels at an upper portion thereof, passing through the second and third panels to expose an upper surface thereof to the floor of the storage tank, being provided with a hollow channel vertically passing through the center thereof, and having an upper portion of the hollow channel communicating with an inside of the storage tank to surround the hollow channel.

Particularly, the system may further include an air injection unit made up of a pneumatic device configured to inject compressed air into the edge leaking water collecting channel or the wall leaking water collecting channel and a pressure gauge configured to measure an internal pressure of the edge leaking water collecting channel or the wall leaking water collecting channel.

According to another aspect of the present invention, there is provided a method for preventing and monitoring a leakage of water from a tank liner at a storage tank, the storage tank including: a concrete reservoir; the tank liner made up of a wall liner that is formed by coupling a plurality of first panels and is attached to an inner wall of the concrete reservoir, and a floor liner that is formed by coupling a plurality of second panels, is attached to a floor of the concrete reservoir, and is coupled to the wall liner by welding; a leaking water collecting plate formed by welding a plurality of third panels and inserted between the floor liner and the floor of the concrete reservoir; and an edge leaking water collecting channel buried in an edge of the storage tank and configured to collect leaking water discharged between the floor liner and the leaking water collecting plate. The method includes installing the third panels for collecting leaking water between a bottom of the floor liner and the floor of the concrete reservoir, causing the leaking water generated from the floor liner to flow to a gap between the floor liner and the third panel, and collecting the leaking water to the edge leaking water collecting channel.

Here, the method may further include, before the collecting of the leaking water, connecting a pneumatic device to the edge leaking water collecting channel or the wall leaking water collecting channel, injecting a predetermined amount of air into a leaking water passage formed by connecting the edge leaking water collecting channel, the wall leaking water collecting channel, the gap between the floor liner and the third panel, and observing a change in pressure of the air inside the leaking water passage to detect whether or not the leakage of water occurs.

Further, the method may further include, between the collecting of the leaking water and the detecting of whether or not the leakage of water occurs, if air bubbles are formed in the storage tank by injecting the air into the leaking water passage using the pneumatic device when generation of the leakage of water is detected by the change in pressure of the air inside the leaking water passage, specifying a point to which the air bubbles are discharged to ascertain a leak.

In the system and method for preventing and monitoring a leakage of water from a tank liner at a storage tank, there are the following effects.

First, unlike the related art, although a leakage of water occurs at a weld zone of the floor liner, the leakage of water to the outside of the storage tank is prevented.

Second, leaking water generated first is immediately collected to leaking water collecting means by a capillary phenomenon.

Third, the floor leaking water collecting channel and the leaking water collecting plate can be welded, and thereby the floor leaking water collecting channel can perform an original role of a channel for preventing the leakage of water.

Fourth, the floor becomes a dual liner structure, and a step-like multistage structure is adopted. Thereby, the leakage of water between the heavy structure support for supporting a heavy structure or the through part of the floor and the liner constituting the floor is prevented.

Fifth, regardless of whether or not a nuclear reactor is operated, it can be checked whether or not the leakage of water occurs and where the leakage of water occurs, and thus an accident is prevented.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Specific structural and functional descriptions presented in embodiments of the present invention are only for illustrative purposes of the embodiments of the present invention. The embodiments of the present invention may be embodied in many different forms. The present invention is not interpreted as being limited to the embodiments described herein. Therefore, it should be understood that various alternatives, modifications, equivalents and other embodiments are included within the spirit and scope of the present invention.

Hereinafter, the present invention will be described in detail with reference to the accompanying drawings.

Figure 2:
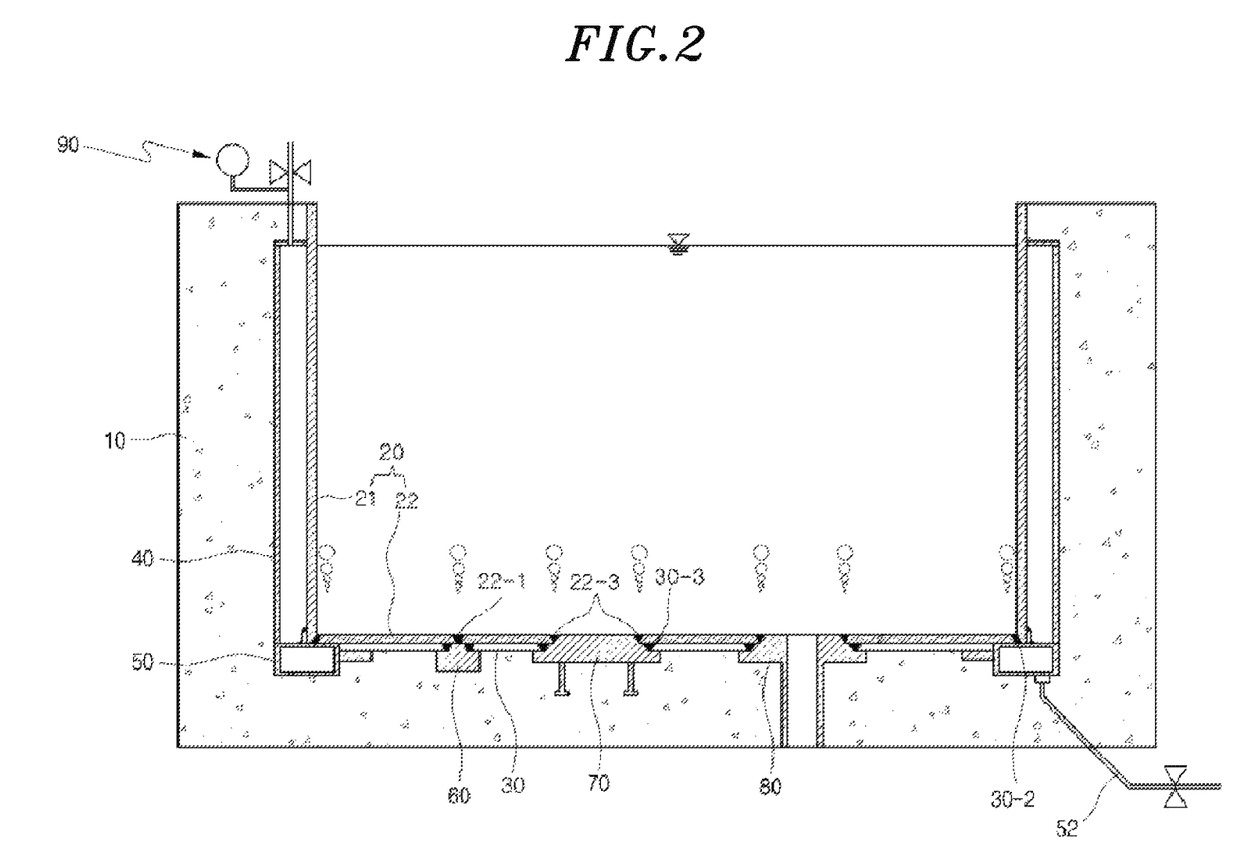
FIG. 2 is a front cross-sectional view illustrating a system for preventing and monitoring a leakage of water from a tank liner at a storage tank according to the present invention.

A system for preventing and monitoring a leakage of water from a tank liner according to the present invention includes a concrete reservoir 10, a tank liner 20 attached to an inner surface of the concrete reservoir 10, a leaking water collecting plate 30 inserted between a bottom of the tank liner 20 and a floor of the concrete reservoir 10, and an edge leaking water collecting channel 50 to which leaking water is collected along an edge.

The concrete reservoir 10 has the shape of a typical storage tank in which a floor and a wall are integrally formed, inside of which water can be stored, and an upper portion of which is open, and is not particularly limited to a specific shape and size.

Since the inner surface of the concrete reservoir 10 is divided into an inner surface of the wall of the concrete reservoir 10 and a top surface of the floor of the concrete reservoir 10, the tank liner 20 is made up of a wall liner 21 attached to the wall of the concrete reservoir 10, and a floor liner 22 attached to the floor of the concrete reservoir 10.

Panels constituting the wall liner 21 and the floor liner 22 are metal plates, and are installed such that the wall of the concrete reservoir 10 can be kept airtight, so that a leakage of water contained in the concrete reservoir 10 is prevented.

Therefore, structural rigidity of the storage tank is maintained by the concrete reservoir 10, and the tank liner 20 takes charge of airtightness for preventing the leakage of water.

The panels constituting the wall liner 21 and the floor liner 22 are restricted by size according to a standard for mass production. When the concrete reservoir 10 exceeds a predetermined size, several panels should be coupled by welding to construct the wall liner 21 or the floor liner 22 such that the inside of the concrete reservoir 10 is kept airtight.

At this point, a weld zone 22-1 is a discontinuous section of the panels, and can be regarded as a region that has a high possibility of damage with the lapse of time due to influences of a water environment and a mechanical load although the tank liner 20 is provided.

Especially, in a nuclear power field, as previously mentioned in the section "Description of the Related Art," since the water in the storage tank serves to shield radioactive rays from escaping to the environment and to cool the nuclear fuel, when a water level of the water in the storage tank is lowered due to the leakage of water generated from the weld zone 22-1, this can lead to an accident.

To prevent such an accident in the related art, as illustrated in FIG. 1, the long leaking water collecting channel 5 is disposed under the weld zone 2-1 between the panels of the floor liner 22 along the weld zone 2-1 in a length direction, and the leaking water is designed to be collected into the leaking water collecting channel 5.

However, as described above, since the opposite upper ends 5-1 of the leaking water collecting channel 5 cannot be welded with the bottom of the tank liner 20, installing the leaking water collecting channel 5 in the related art cannot be an ultimate solution of the leakage of water generated from the weld zone 2-1.

Therefore, in the present invention, as illustrated in FIG. 2, the leaking water collecting plate 30 is provided between the bottom of the floor liner 22 and the floor of the concrete reservoir 10.

Like the wall liner 21 or the floor liner 22 constituting the tank liner 20, a plurality of panels is coupled by welding, thus forming the leaking water collecting plate 30.

At this point, the panels constituting the wall liner 21 are referred to as first panels, and the panels constituting the floor liner 22 are referred to as second panels. The panels constituting the leaking water collecting plate 30 are referred to as third panels.

Therefore, although the leakage of water is generated from the weld zone 22-1 between the second panels constituting the floor liner 22 due to a crack caused by stress concentration resulting from the progress of corrosion, the leaking water is not discharged to the concrete reservoir 10, and soaks between the floor liner 22 and the leaking water collecting plate 30.

In this case, to collect the leaking water soaking between the floor liner 22 and the leaking water collecting plate 30, the edge leaking water collecting channel 50 is provided along the edge of the tank liner 20 as illustrated in FIG. 2.

Although not illustrated in FIG. 2, the edge leaking water collecting channel 50 is formed as a passage into which the leaking water soaking between the floor liner 22 and the leaking water collecting plate 30 flows.

At this point, the leaking water soaking between the floor liner 22 and the leaking water collecting plate 30 is collected to the edge leaking water collecting channel 50 along a narrow gap between the floor liner 22 and the leaking water collecting plate 30 at a high speed due to a capillary phenomenon.

Meanwhile, in the present invention, a coupler 60 is installed under the weld zone 22-1 between the second panels constituting the floor liner 22.

Figure 3A:
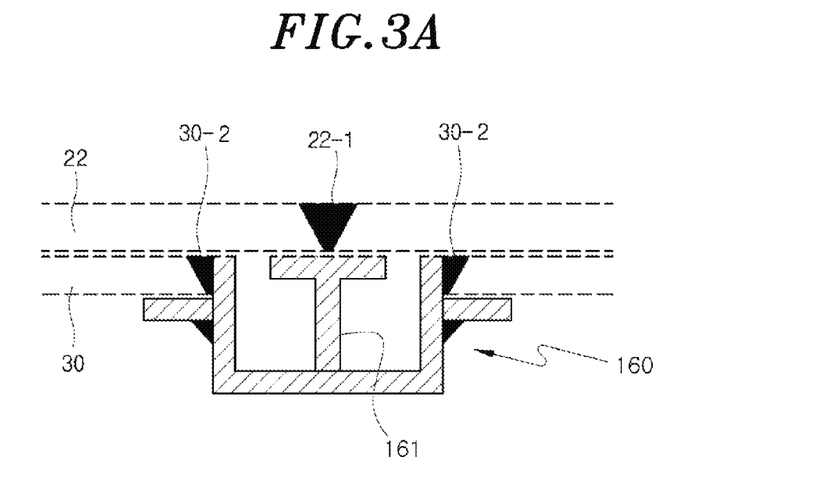
FIG. 3A is a front cross-sectional view illustrating a case in which a coupler is a floor leaking water collecting channel.
Figure 3B:
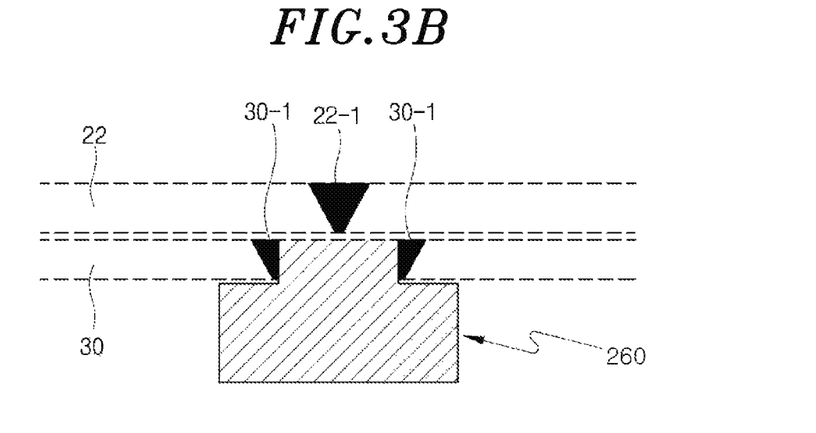
FIG. 3B is a front cross-sectional view illustrating a case in which the coupler is a floor coupling block.

As illustrated in FIG. 3A, the coupler 60 may be embodied as a floor leaking water collecting channel 160 formed to be similar to the leaking water collecting channel 5 of FIG. 1. As illustrated in FIG. 3B, the coupler 60 may be embodied as a floor coupling block 260 formed in a solid block form unlike the leaking water collecting channel 5 of FIG. 1.

In the above two cases, the coupler 60 is installed in such a manner that it is buried in the floor of the concrete reservoir 10.

The floor leaking water collecting channel 160 illustrated in FIG. 3A is different from the leaking water collecting channel 5 of FIG. 1 in that it is welded with the leaking water collecting plate 30.

The floor leaking water collecting channel 160 and the leaking water collecting plate 30 are welded with each other, and thereby a strong defense against the leakage of water generated from the floor liner 22 is possible.

In this case, when the leaking water fills and overflows the floor leaking water collecting channel 160, the leaking water does not soak into concrete, and is collected to the edge leaking water collecting channel 50 by the capillary phenomenon while soaking between the floor liner 22 and the leaking water collecting plate 30.

Further, like the leaking water collecting channel 5 illustrated in FIG. 1, the same leaking water reservoir 7 may be coupled to the floor leaking water collecting channel 160.

Since the floor leaking water collecting channel 160 is empty, a weld zone support 161 may be installed, as illustrated in FIG. 3A, such that the floor liner 22 does not sag into the floor leaking water collecting channel 160.

The coupler 60 installed under the weld zone 22-1 between the second panels constituting the floor liner 22 may serve as the floor leaking water collecting channel 160 described above or the floor coupling block 260 illustrated in FIG. 3B.

Here, the floor coupling block 260 does not serve to collect the leaking water, but serves to support the weld zone 22-1 between the second panels such that the weld zone 22-1 does not sag down.

Steps are formed at opposite upper portions of both the floor coupling block 260 of FIG. 3B and the floor leaking water collecting channel 160 of FIG. 3A, so that the leaking water collecting plate 30 can be placed on planes formed as the steps and be welded to form weld zones 30-1 and 30-2.

In this way, when the leaking water collecting plate 30 is placed on the planes formed as the steps and is welded, the leaking water collecting plate 30 is supported by the planes formed as the steps. Since no load is applied to the weld zones 30-1 and 30-2 between the leaking water collecting plate 30 and the coupler 60, the weld zones 30-1 and 30-2 between the leaking water collecting plate 30 and the coupler 60 can be firmly maintained.

Figure 5:
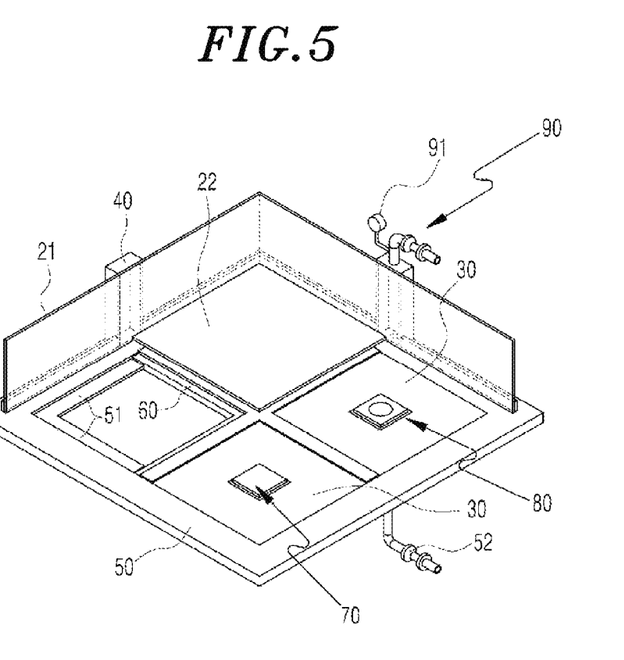
FIG. 5 is a top exploded perspective view illustrating the system for preventing and monitoring a leakage of water from a tank liner at a storage tank according to the present invention.

Further, as illustrated in FIGS. 2 and 5, a wall leaking water collecting channel 40 similar to the floor leaking water collecting channel 160 may be formed on an outer surface of the wall liner 21.

The wall leaking water collecting channel 40 is formed because a weld zone (not illustrated) between the first panels constituting the wall liner 21 is also subjected to a leakage of water due to its damage like the weld zone 22-1 between the second panels constituting the floor liner 22.

Here, unlike the leaking water collecting channel 5 of FIG. 1, the wall leaking water collecting channel 40 can be welded to the first panels constituting the wall liner 21.

The leaking water collecting channel 5 of FIG. 1 is installed, and then the concrete for forming the floor of the concrete reservoir 10 is poured. For this reason, when the floor liner 22 is constructed, there is no work space capable of welding the floor liner 22 and the leaking water collecting channel 5.

In contrast, when the wall leaking water collecting channel 40 and the wall liner 21 are welded, and then the concrete is poured, the wall liner 21 can be welded.

Here, leaking water flowing into the wall leaking water collecting channel 40 is guided downward along the wall leaking water collecting channel 40, and is collected to the edge leaking water collecting channel 50.

For reference, in this case, a separate leaking water reservoir 7 may also be connected to the edge leaking water collecting channel 50, like the related art of FIG. 1.

Figure 6:
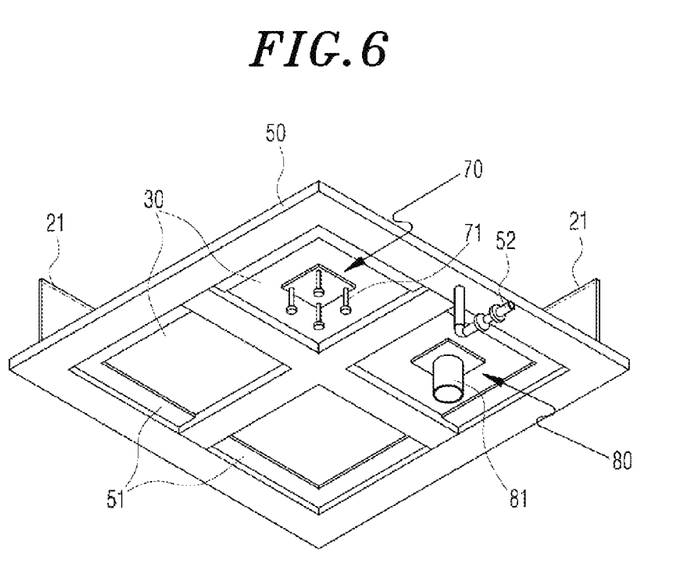
FIG. 6 is a bottom exploded perspective view illustrating the system for preventing and monitoring a leakage of water from a tank liner at a storage tank according to the present invention.

As illustrated in FIGS. 5 and 6, the edge leaking water collecting channel 50 is provided with a drainpipe 52 that can drain the leaking water from the edge leaking water collecting channel 50 to the leaking water reservoir 7.

Figure 4:
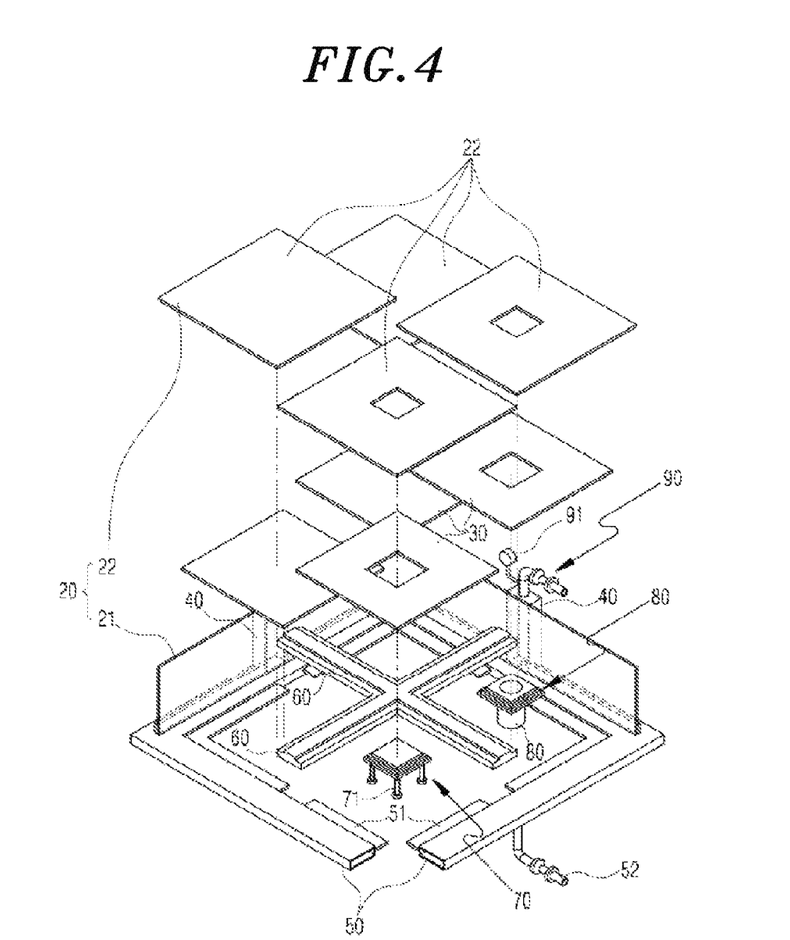
FIG. 4 is an exploded perspective view illustrating the system for preventing and monitoring a leakage of water from a tank liner at a storage tank according to the present invention.

Meanwhile, as illustrated in FIGS. 2 and 4, a heavy structure support 70 for supporting a heavy structure installed inside the storage tank in an upward direction may be installed.

Particularly, in the case of a research reactor, a heavy structure such as a nuclear reactor or a test device is installed inside a storage tank, and is fixed to a floor of the storage tank which is to able to maintain soundness when an earthquake takes place.

To this end, when the heavy structure is directly coupled to the floor liner 22 using members such as fixing bolts 71, the floor liner 22 may be damaged when an earthquake takes place, and an accident that water in the storage tank flows out may occur.

Therefore, the heavy structure support 70 is required.

In this case, in the present invention, an upper edge of the heavy structure support 70 is formed in a stepped structure, and thereby the second panels constituting the floor liner 22 and the third panels constituting the leaking water collecting plate 30 can be welded to the upper edge of the heavy structure support 70 in a multistage structure. For this reason, generation of the leakage of water caused by damage to weld zones 22-3 and 30-3 of the upper edge of the heavy structure support 70 is prevented.

Further, in the case of the research reactor, a through-hole may be formed in a lower portion of the storage tank for the purpose of upward and downward movements of control rods. At this point, as illustrated in FIGS. 2 and 4, to prevent the leakage of water caused by the through-hole, a sleeve 81 inserted into the through-hole is provided, and a through part 80 made up of a body communicating with the sleeve 81 is installed.

In this case, in the present invention, for a watertight structure of the through part 80, an upper edge of the through part is formed in a multistage structure like the heavy structure support 70. The floor liner 22 and the leaking water collecting plate 30 are placed and welded step by step, and thereby generation of the leakage of water caused by the through part 80 is prevented.

As illustrated in FIG. 5, the edge leaking water collecting channel 50 is provided with a leaking water collecting plate landing 51 such that the leaking water collecting plate 30 can be placed and welded step by step. The leaking water collecting plate 30 is welded to the leaking water collecting plate landing 51, and thereby the leakage of water is prevented.

As a result, the wall leaking water collecting channel 40, the edge leaking water collecting channel 50, and the gap between the floor liner 22 and the leaking water collecting plate 30, each of which is a section along which the leaking water flows and is collected in the present invention, are interconnected such that the leaking water can flow. Further, air can also flow to the same path.

Here, a passage formed by mutually connecting the wall leaking water collecting channel 40, edge leaking water collecting channel (50), the gap between the floor liner 22 and the leaking water collecting plate 30, and the floor leaking water collecting channel 160, each of which is a section along which the leaking water flows and is collected in the present invention, is referred to as a "leaking water passage."

For reference, although it can be shown that the floor liner 22 and the leaking water collecting plate 30 come into complete contact with each other due to a load of the floor liner 22 and a load of the heavy structure or object on the top of the floor liner 22 and the leaking water does not flow, a slight gap along which the leaking water can flow due to the capillary phenomenon can be formed because the third panels constituting the leaking water collecting plate 30 and the second panels constituting the floor liner 22 are formed of a rigid member.

Meanwhile, as illustrated in FIGS. 2 and 5, an air injection unit 90 made up of a pneumatic device for injecting air into the leaking water passage is provided to inject a predetermined amount of air into the leaking water passage, and a pressure gauge 91 for measuring an internal pressure of the leaking water passage is installed to monitor a change in the internal pressure of the leaking water passage. Thereby, it can be detected whether or not the leakage of water occurs.

At this point, the air injection unit 90 is preferably installed on an upper portion of the wall leaking water collecting channel 40 for easy observation.

That is, after a predetermined amount of air is injected into the leaking water passage, when an upper end of the wall leaking water collecting channel 40 corresponding to an inlet or an outlet by which the leaking water passage directly leads to the outside is blocked, a pressure of the air is kept constant in the leaking water passage.

At this point, if the leakage of water begins to be generated, the internal pressure of the leaking water passage is reduced. This pressure reduction can be detected by monitoring the pressure gauge 91.

For example, when the internal pressure of the leaking water passage is set to 5 bar and then goes down to 3 or 2 bar, it is detected that the leakage of water occurs at any point.

At this point, the pressure reduction occurs when the air escapes into the water in the storage water through a leak.

In this case, a leak can be detected by ascertaining a point at which air bubbles occur as illustrated in FIG. 2.

Once it is detected that the leakage of water occurs, a large amount of air is injected into the leaking water passage using the air injection unit 90. Thereby, a large amount of air bubbles occur at the leak, so that the leak can be ascertained.

For reference, in the related art illustrated in FIG. 1, the leaking water collecting channel 5 of FIG. 1 and the floor liner 2 are not welded. Thus, although air blows in through the leaking water passage, the air is vented to a gap 5-1 between the leaking water collecting channel 5 and the floor liner 2, so that the detection of the leakage of water itself cannot be realized by the pneumatic device.

However, in the present invention, the leaking water collecting plate 30 is provided such that the air cannot leak between the floor liner 22 and the floor of the concrete reservoir 10. Thereby, it is possible to detect whether or not the leakage of water occurs using the air injection unit 90 and to detect the leak from which the leakage of water occurs.

Therefore, in the present invention, it is possible to rapidly detect whether or not the leakage of water occurs at the storage tank for the spent nuclear fuel of research or commercial reactors. Further, it can be detected through the leaking water passage whether or not the leakage of water occurs even during normal operation.

The method for preventing and monitoring a leakage of water from a tank liner according to the present invention has already been described in the operation of each component constituting the system for preventing and monitoring a leakage of water from a tank liner, and further description thereof will be omitted.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A system for preventing and monitoring a leakage of water from a tank liner at a storage tank, the system comprising:
   a concrete reservoir;
   the tank liner made up of a wall liner that is formed by coupling a plurality of first panels and is attached to an inner wall of the concrete reservoir, and a floor liner that is formed by coupling a plurality of second panels, is attached to a floor of the concrete reservoir, and is coupled to the wall liner by welding;
   a leaking water collecting plate formed by welding a plurality of third panels and inserted between the floor liner and the floor of the concrete reservoir; and
   an edge leaking water collecting channel buried in an edge of the storage tank and configured to collect leaking water discharged between the floor liner and the leaking water collecting plate.

2. The system according to claim 1, further comprising a wall leaking water collecting channel that is buried in a wall of the concrete reservoir on an outer surface of the wall liner, is formed along a weld zone between the first panels at a long length, and is coupled to the edge leaking water collecting channel at a lower portion thereof.

3. The system according to claim 2, further comprising an air injection unit made up of a pneumatic device configured to inject compressed air into the edge leaking water collecting channel or the wall leaking water collecting channel and a pressure gauge configured to measure an internal pressure of the edge leaking water collecting channel or the wall leaking water collecting channel.

4. The system according to claim 1, further comprising a coupler that is buried in the floor of the concrete reservoir floor at a lower portion thereof, protrudes to correspond to a thickness of the third panel at an upper portion thereof, is formed as long as a length of the third panel, and is coupled with the third panels by welding the third panels at opposite upper sides thereof.

5. The system according to claim 4, wherein a weld zone between the second panels is disposed above the coupler in a length direction of the coupler, and the coupler serves as a floor leaking water collecting channel with a cross-section that is formed as a channel whose upper portion is open.

6. The system according to claim 4, wherein a weld zone between the second panels is disposed above the coupler in a length direction of the coupler, and the coupler serves as a floor coupling block as an inside thereof is formed in a solid block form.

7. The system according to claim 1, further comprising a heavy structure support that is buried in the floor of the concrete reservoir at a lower portion thereof, protrudes to correspond to a length adding up thicknesses of the second and third panels at an upper portion thereof, passes through the second and third panels to expose an upper surface thereof to the floor of the storage tank, and is welded to the second and third panels at an upper edge thereof.

8. The system according to claim 1, further comprising a through part that has a cylindrical sleeve formed by extending up to a lower portion of the concrete reservoir and is welded to the second and third panels at an upper edge thereof, the cylindrical sleeve being buried in the floor of the concrete reservoir at a lower portion thereof, protruding to correspond to a length adding up thicknesses of the second and third panels at an upper portion thereof, passing through the second and third panels to expose an upper surface thereof to the floor of the storage tank, being provided with a hollow channel vertically passing through the center thereof, and having an upper portion of the hollow channel communicating with an inside of the storage tank.

9. A method for preventing and monitoring a leakage of water from a tank liner at a storage tank,
the storage tank including:
a concrete reservoir;
the tank liner made up of a wall liner that is formed by coupling a plurality of first panels and is attached to an inner wall of the concrete reservoir, and a floor liner that is formed by coupling a plurality of second panels, is attached to a floor of the concrete reservoir, and is coupled to the wall liner by welding;
a leaking water collecting plate formed by welding a plurality of third panels and inserted between the floor liner and the floor of the concrete reservoir; and
an edge leaking water collecting channel buried in an edge of the storage tank and configured to collect leaking water discharged between the floor liner and the leaking water collecting plate,
the method comprising installing the third panels for collecting leaking water between a bottom of the floor liner and the floor of the concrete reservoir, causing the leaking water generated from the floor liner to flow to a gap between the floor liner and the leaking water collecting plate, and collecting the leaking water at the edge leaking water collecting channel.

10. The method according to claim 9, the storage tank further including a wall leaking water collecting channel that is buried in a wall of the concrete reservoir on an outer surface of the wall liner,
the method further comprising, before the collecting of the leaking water, connecting a pneumatic device to the edge leaking water collecting channel or the wall leaking water collecting channel, injecting a predetermined amount of air into a leaking water passage formed by connecting the edge leaking water collecting channel, the wall leaking water collecting channel, and the gap between the floor liner and the leaking water collecting plate, and observing a change in pressure of the air inside the leaking water passage to detect whether or not the leakage of water occurs.

11. The method according to claim 10, further comprising, between the collecting of the leaking water and the detecting of whether or not the leakage of water occurs, if air bubbles are formed in the storage tank by injecting the air into the leaking water passage using the pneumatic device when generation of the leakage of water is detected by the change in pressure of the air inside the leaking water passage, specifying a point to which the air bubbles are discharged to ascertain a leak.

\* \* \* \* \*